(12) United States Patent
Thomas, III

(10) Patent No.: US 7,874,490 B2
(45) Date of Patent: Jan. 25, 2011

(54) ACTIVE ELECTRO-OPTICAL IDENTIFICATION

(75) Inventor: Fred Charles Thomas, III, Fort Collins, CO (US)

(73) Assignee: Britta Technologies, LLC, Las Vegas, NV (US)

( * ) Notice: Subject to any disclaimer, the term of this patent is extended or adjusted under 35 U.S.C. 154(b) by 1085 days.

(21) Appl. No.: 11/479,578

(22) Filed: Jun. 30, 2006

(65) Prior Publication Data

US 2008/0000990 A1   Jan. 3, 2008

(51) Int. Cl.
*G06K 19/06* (2006.01)
(52) U.S. Cl. ........................ 235/491; 235/375
(58) Field of Classification Search ............... 235/491, 235/385, 383, 492, 375
See application file for complete search history.

(56) References Cited

U.S. PATENT DOCUMENTS

| | | | |
|---|---|---|---|
| 3,743,820 A | 7/1973 | Willits et al. | |
| 4,222,662 A | 9/1980 | Kruegle | |
| 5,118,930 A | 6/1992 | Takada | |
| 5,237,164 A | 8/1993 | Takada | |
| 5,477,219 A | 12/1995 | Zarembo et al. | |
| 5,656,360 A | 8/1997 | Faykish et al. | |
| 6,019,287 A | 2/2000 | Mann | |
| 6,269,169 B1 | 7/2001 | Funk et al. | |
| 6,507,441 B1 * | 1/2003 | Eisenberg et al. | 359/627 |
| 6,542,083 B1 * | 4/2003 | Richley et al. | 340/825.49 |
| 6,843,564 B2 * | 1/2005 | Putilin et al. | 353/7 |
| 7,074,478 B2 | 7/2006 | Abraham | |
| 7,190,907 B2 * | 3/2007 | Cicchiello | 398/170 |
| 7,387,393 B2 | 6/2008 | Reich et al. | |
| 7,498,074 B2 | 3/2009 | Ueda et al. | |
| 2002/0142121 A1 | 10/2002 | Hingsen-Gehrmann et al. | |
| 2003/0174941 A1 | 9/2003 | Cizek | |
| 2006/0060651 A1 * | 3/2006 | McIntyre et al. | 235/454 |
| 2008/0000976 A1 | 1/2008 | Thomas | |

FOREIGN PATENT DOCUMENTS

| | | |
|---|---|---|
| EP | 0 265 827 | 5/1988 |
| EP | 0 416 742 A2 | 3/1991 |
| EP | 0 660 292 | 6/1995 |
| EP | 1 455 205 | 9/2004 |
| WO | WO 99/36806 | 7/1999 |
| WO | WO 02/33477 | 4/2002 |
| WO | WO 2008/005724 | 1/2008 |
| WO | WO 2008/005725 | 1/2008 |

OTHER PUBLICATIONS

International Search Report and Written Opinion from Co-Pending Application, PCT/US2007/071957, published as WO 08/005725.
International Search Report and Written Opinion from Co-Pending Application, PCT/US2007/071955, published as WO 08/005724.
Non-Final Office Action dated Dec. 10, 2009 in U.S. Appl. No. 11/480,105.
Final Office Action dated Jun. 7, 2010 in U.S. Appl. No. 11/480,105.

* cited by examiner

*Primary Examiner*—Edwyn Labaze
(74) *Attorney, Agent, or Firm*—Knobbe, Martens, Olson & Bear, LLP

(57) ABSTRACT

Embodiments for active electro-optical identification are disclosed.

58 Claims, 9 Drawing Sheets

ACTIVE ELECTRO-OPTICAL IDENTIFICATION

FIELD

The subject matter disclosed herein relates to electro-optical identification.

BACKGROUND

Automated identification of objects has become commonplace. For example, radio frequency identification (RFID) tags may frequently be used to track the shipment and inventory of the goods. RFID tags may also be found on goods offered for sale. RFID tags may also be used in other applications, including electronic toll collection for vehicles, for example.

Other techniques for automated identification of objects may utilize bar codes. However, RFID and bar code technologies may suffer from various shortcomings, including limited range and/or excess expense. For example, bar code scanning may only function properly from a maximum distance of several feet, and typical bar code implementations may require that the bar code be scanned from a maximum distance of only several inches. Similarly, passive RFID implementations may have effective ranges of only a few feet. Active RFID technologies may provide increased range, but at a significant increase in cost due in part to the active circuitry of the RFID tag, including power supplies that may have limited life span. Active RFID tag implementations may make inefficient use of power due in part to the requirement that the tag be able to transmit over usable distances, resulting in relatively expensive, large, and/or short-lived power supplies.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
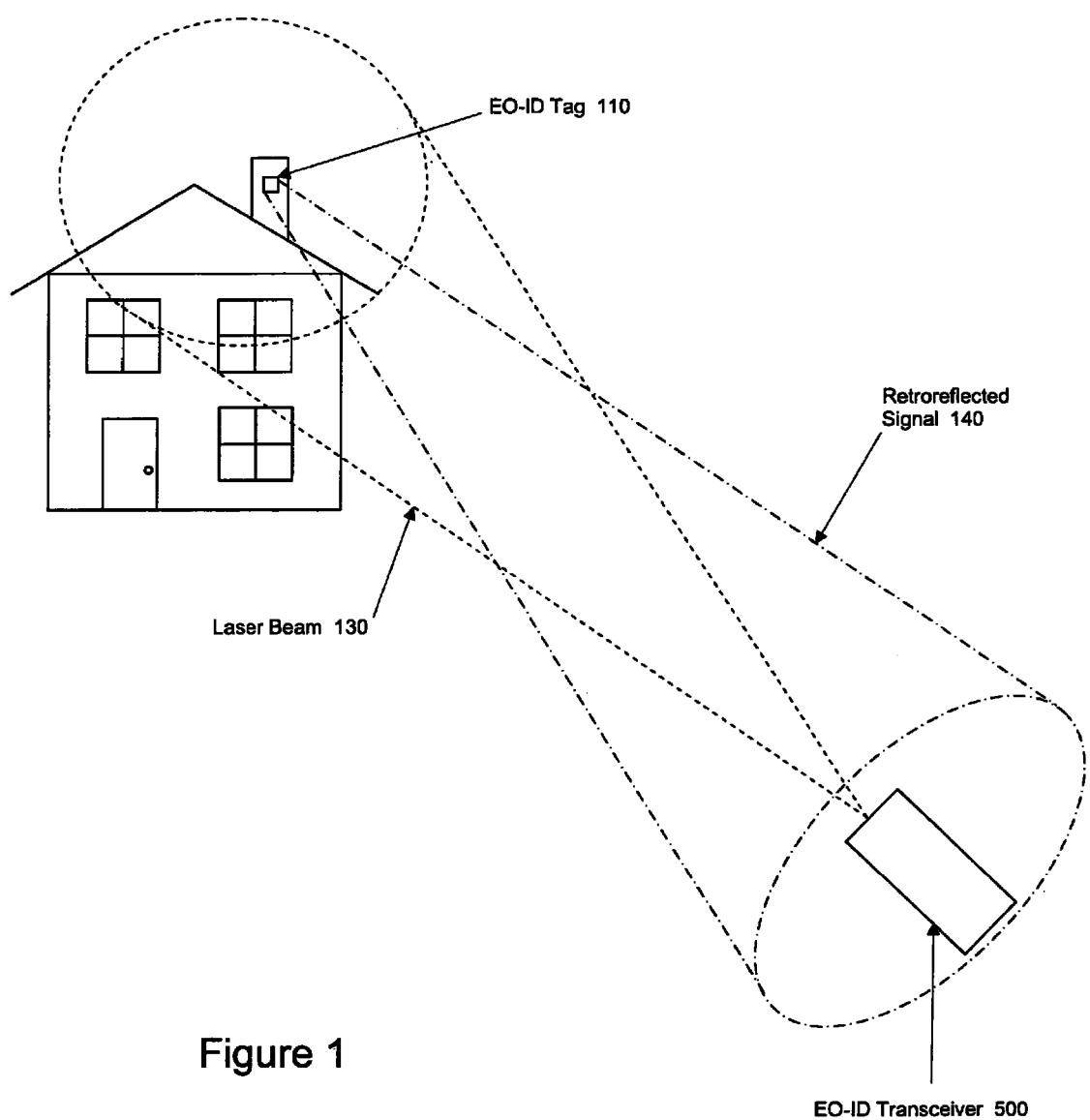
FIG. 1 is a diagram depicting an example embodiment of an active optical identification tag located on a house and an example embodiment of an electro-optical transceiver.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As pointed out above, difficulties with state of the art technology, particularly in automated identification, for example, may include limited range and/or excess cost and/or power supplies with large, expensive, and/or limited-life power supplies. A need, therefore, exists for techniques and/or systems that may provide, for example, automated identification of objects at lower costs with more efficient use of power.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

As used herein, the term "retroreflective" is related to techniques and/or devices for reflecting light approximately back along a path to the light source.

As used herein, the term "retrodireactional" is related to techniques and/or devices for redirecting light approximately back along a path to the light source. Retrodireactional techniques and/or devices may comprise retroreflective techniques and/or devices, and may also comprise other techniques for redirecting light such as phase conjugation.

As used herein, the term "light modulation" and/or "light modulator" may relate to any techniques and/or devices capable of modulating the intensity of light as it is received at and/or reflected from an optical identification tag. These techniques and/or devices may include, but are not limited to, liquid crystal shutters, electrostatic micro electromechanical system (MEMS) light shutters, electrostatic and/or piezo electric light path deformation mechanisms, and electrostatically displaced fluid contained retroreflective elements. Again, these are merely examples of techniques and/or devices for light modulation, and the scope of the claimed subject matter is not limited in these respects.

As used herein, the term "layer" as it relates to optical identification tags is meant to include any sub-portion of an optical identification tag. For an embodiment, a layer may comprise a sheet of relatively thin material that may or may not comprise retroreflective and/or light encoding structures. For an embodiment, two or more layers may be placed and/or formed one on top of the other to form, at least in part, an optical identification tag. However, these are merely examples of layers as related to optical identification tags, and the scope of the claimed subject matter is not limited is these respects.

In general, one or more embodiments for electro-optical identification (EO-ID) may provide identification capabilities that work at relatively long distances (possibly up to a mile or more) with appropriate line-of-sight and visibility. An embodiment may comprise an active thin embossed plastic optical identification tag which may be attached to an object to be identified/tracked. An EO-ID tag implemented in accordance with one or more embodiments described herein may have low cost in mass production. Further, an EO-ID tag implemented in accordance with one or more embodiments described herein may be read with a solid state laser-based transceiver unit. A transceiver may illuminate an optical tag with the laser. The laser light may be retroreflected by the tag back to the transceiver. For an embodiment, the retroreflected light may be modulated by the tag to communicate a code to the transceiver. The code to be communicated may be pre-programmed or may be updated in the field.

The contents of the data transmitted using active optical identification tags may be dynamically changed or updated. An embodiment of an EO-ID tag may comprise an integrated light modulator in combination with a thin retroreflective array material which may be attached to an object. The object, via the electro-optical identification tag, may communicate information back to the EO-ID transceiver by way of the modulated light.

Embodiments of active EO-ID tags may be read with a laser based transceiver unit which may poll active EO-ID tags placed on remote objects. Information that may be changing on an on-going basis may be readily updated by the active EO-ID tag. The dynamic or content changing communication over long distances made possible using embodiments described herein may substantially place the burden of power required for implementation of such communication upon one of the two communicating devices (EO-ID tag or EO-ID transceiver). The EO-ID tag may require very low power and the EO-ID transceiver power requirements may be governed by the distance or range of communication desired. Thus, an EO-ID tag implemented in accordance with one or more embodiments described herein may be manufactured at low cost and may utilize small, inexpensive, and long-lasting power supplies.

Embodiments described herein for EO-ID tags may differ from typical static bar code implementations in that bar-code tag information may be static and may not be able to be updated dynamically. Also, the readable distance for static bar-codes are limited typically to less than a few feet and at most a few tens of feet. This is due to a requirement that the interrogating laser stylus spot for a bar-code is required to be smaller than the bar code bars. Also, the reflective mechanism of a bar code tag is typically diffuse. Creating and maintaining a small scanned spot at larger distances may be problematic. The drop-off in reflected signal with distance for a diffusely reflected target is also exponential. The active EO-ID embodiments described herein may avoid these difficulties.

Active EO-ID embodiments such as those described herein may also have advantages over RFID implementations. One advantage of EO-ID over RFID may lie in how and where power is consumed in the communications channel to transmit information. For RFID systems, an RFID tag may require relatively large amounts of power to transmit information over larger distances. This is in contrast to one or more active EO-ID tag implementations where very small amounts of power may be used to modulate retroreflected light.

As previously mentioned, and as more fully described below, light modulating technologies that may be used in one or more embodiments of active EO-ID tags may comprise electric field driven light shuttering devices which may utilize very little electrical current and therefore may use very low power. For example, a LCD shutter of this type could be driven by a coin size battery for on the order of two to three years. Due to low power utilization, EO-ID tag embodiments such as those described herein may be several orders of magnitude more efficient than typical RFID implementations.

Embodiments of EO-ID tags may be put to advantageous use in a variety of settings. FIG. 1 is an illustration of one such setting. In FIG. 1, an EO-ID tag 110 is located on a chimney of a house. EO-ID tag 110 for this example may be used to communicate information from an electrical power meter. EO-ID tag 110 may be continuously or periodically updated with power meter information. The information from the power meter may be read by illuminating the EO-ID tag 110 using a transceiver 500. Transceiver 500 may illuminate EO-ID tag 110 with laser beam 130 produced by a solid-state laser within the transceiver. Laser beam 130 may be received at EO-ID tag 110 and may be retroreflected by EO-ID tag 110 back to transceiver 500. EO-ID tag 110 may modulate the retroreflected light according to a communication code to transmit power meter reading information. In this manner, a power meter may be read from a distance, perhaps from a vehicle, rather than having to walk up to the meter and read it in the typical fashion. For this example embodiment, EO-ID tag 110 may be coupled to an external power source, although the scope of the claimed subject matter is not limited in this respect.

The example embodiment of FIG. 1 is merely one of a wide range of possible uses for EO-ID embodiments implemented in accordance with claimed subject matter. Another example application may involve placing active EO-ID tags on railway cars and/or shipping containers. The EO-ID tags may contain updateable information regarding the logistics of particular rail cars and/or shipping containers such as content, destination and/or delivery commitments. A tag may initially be programmed with this information via any of several methods including, but not limited to, direct hardwire based, optical transmitted based and/or RF based communication. For one embodiment, once programmed, tags may be read as the rail car and/or shipping container passes under superstructures along a rail-line which would have EO-ID transceivers mounted thereon which would then supply this information to an overall rail freight logistics network. Alternatively, aircraft based inventories may be taken of an entire trains moving along the tracks with an EO-ID transceiver in the aircraft.

Figure 2:
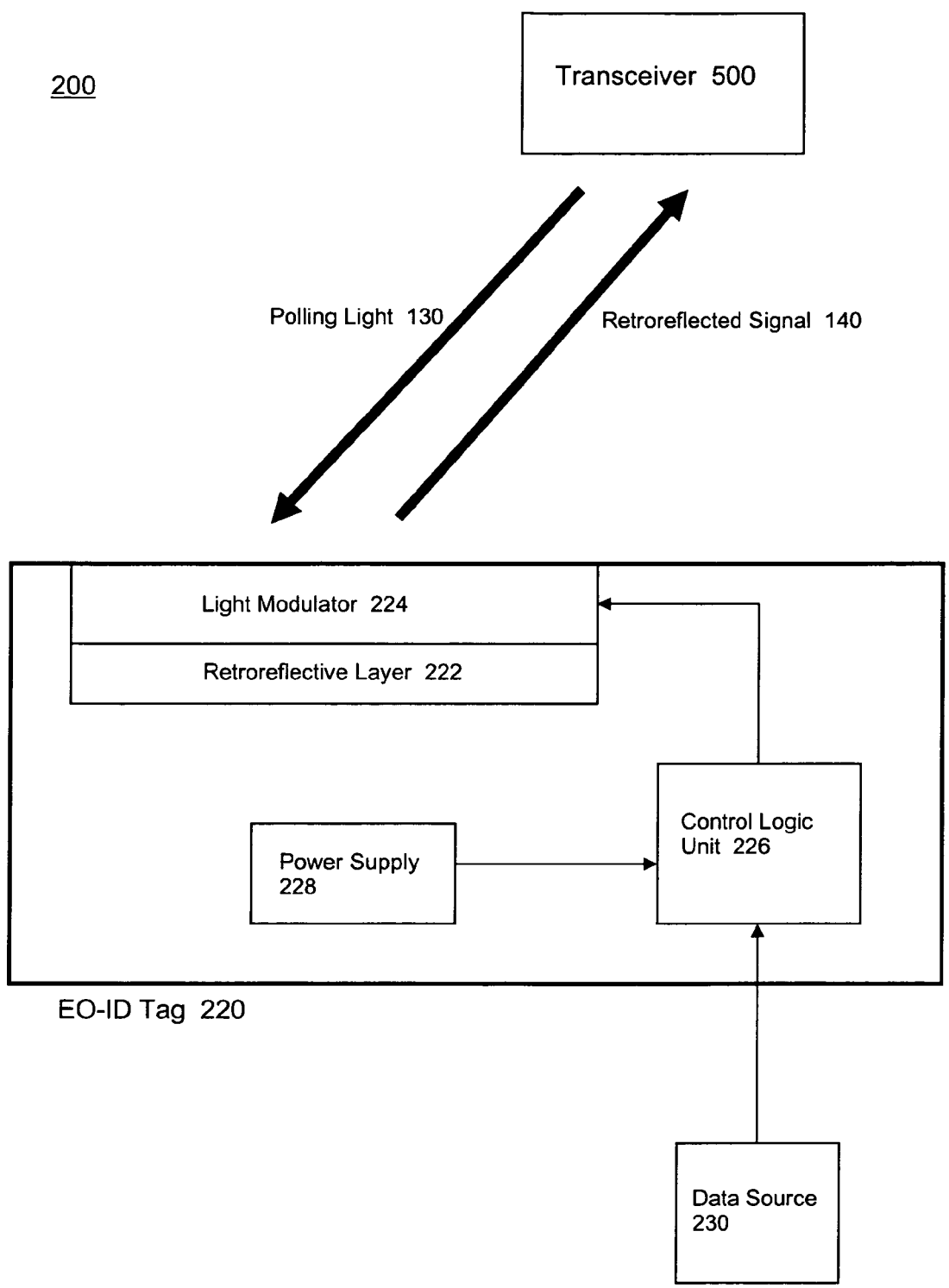
FIG. 2 is a block diagram of an example embodiment of an active optical identification tag comprising a light path modulator.

FIG. 2 is a block diagram of an example system 200 including an example embodiment of an EO-ID tag 220 comprising a light modulator 224 and a retroreflective layer 222. EO-ID tag 220 may also comprise a power supply 228 and a control logic unit 226. Control logic unit 226 may be coupled to an external data source 230 for an embodiment. For this example system, a polling light 130 from transceiver 500 may be modulated upon reflection via light modulator 224 to produce a retroreflected signal 140. Retroreflected signal 140 may be received at transceiver 500. Light modulator 224 for this example embodiment may comprise an active transmissive light modulator and/or a phase modulator located in front of retroreflective layer 222. Light modulator 224 may comprise a single shutter or an array of devices. If light modulator 224 comprises an array, light may be modulated in unison as if being modulated by one shuttering device or the array may utilize a time-staggered shuttering sequence which may produce a phased or stretched signal. In this manner higher bandwidth signals maybe communicated.

Light modulator 224 of example EO-ID tag 220 may comprise any of a wide range of devices and/or techniques for modulating light, including, but not limited to, MEMS artificial eyelid actuator arrays, MEMS Flixel shutter arrays, cholesteric liquid crystal shutters, ferroelectric liquid crystal shutters, other liquid crystal shutter types, suspended particle device (SPD) light shutters, electrochromic light shutters and/or nano-chromatic light shutters. These are merely examples of devices and/or techniques related to light modulation, and the scope of the claimed subject matter is not limited in this respect.

Power supply 228 for this example embodiment may comprise a battery. For other embodiments, power supply 228 may comprise a photocell. Still other embodiments may comprise other types of power supplies. For some embodiments, power may be supplied by an external power source.

Control logic unit 226 may comprise any circuitry capable of causing light modulator 224 to modulate according to a code. Control logic unit 226 may also comprise a memory capable of storing code data. Code data may be preprogrammed into a tag for some embodiments. Also for some embodiments, the code may be updated. For other embodiments, code information may be provided by an external data source such as data source 230. Data source 230 for one embodiment may be coupled to tag 220 via an RF link.

Figure 3:
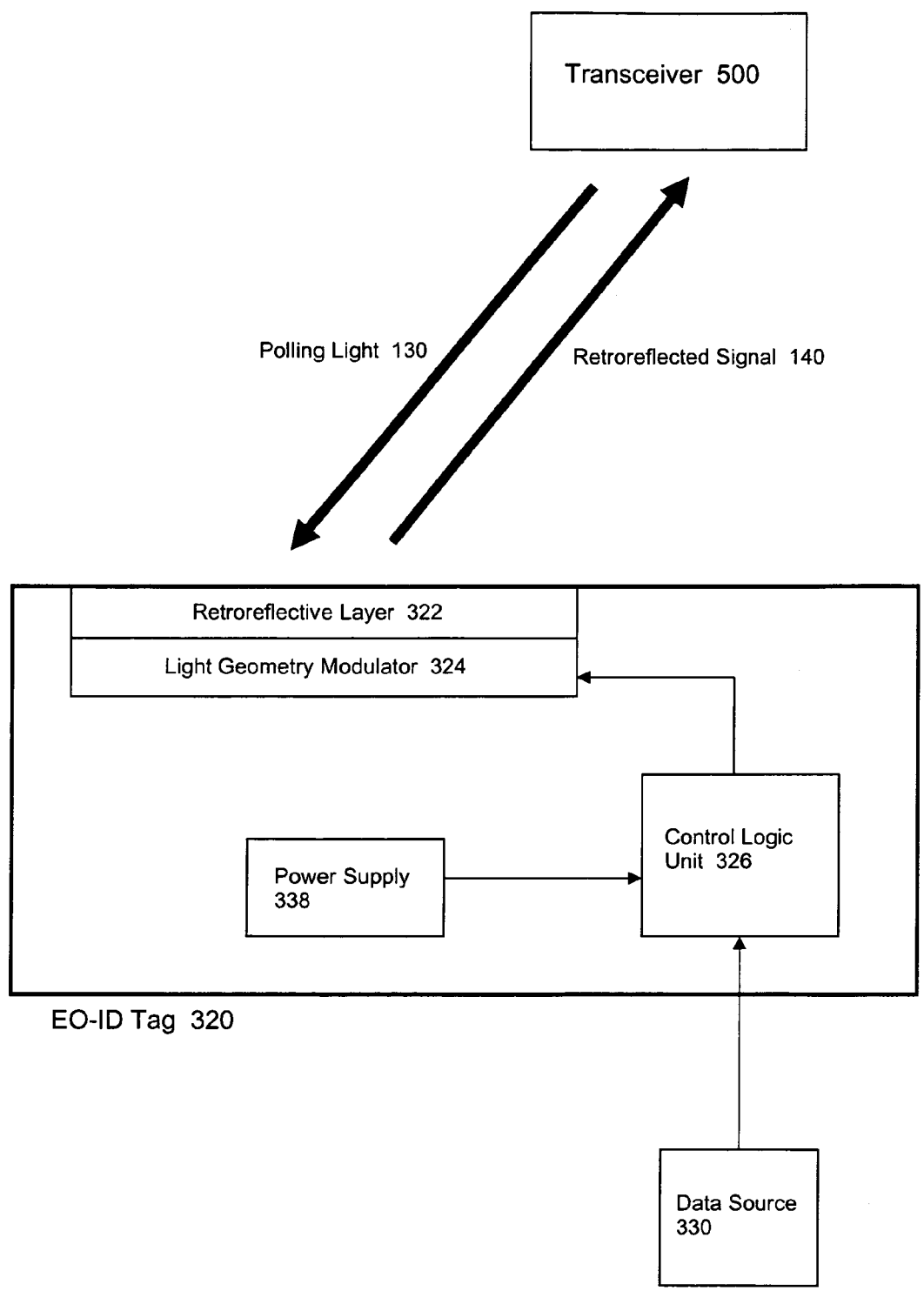
FIG. 3 is a block diagram of an example embodiment of an active optical identification tag comprising a light geometry modulator.

FIG. 3 is a block diagram of an example system 300 comprising an example embodiment of an active EO-ID tag 320 comprising a light geometry modulator 324. Tag 320 may be similar in many respects to tag 220 discussed above. For this example embodiment, however, rather than a light modulator positioned over a retroreflective layer, the example embodiment for EO-ID tag 320 comprises light geometry modulator 324 positioned beneath retroreflective layer 322. Light geometry modulator 324 may modulate light reflected by retroreflective layer 322 by altering the geometry of retroreflective layer 322. For some embodiments, retroreflective layer 322 and light geometry modulator 324 may be integrated.

For one example embodiment, a retroreflective layer 322 and light geometry modulator 324 may comprise an array of micro-reflective corner-cube elements formed from piezo electric plastic that may variable distort the orientation of three orthogonally oriented corner-cube mirrors of the elements of the micro-reflective array and/or distort the flatness of one or more mirrors. For another example embodiment, an integrated light geometry modulator 324 and retroreflective layer 322 may comprise a deformable plastic retroreflective array comprising one or more reflective surfaces having a thin film of memory shape material coated with a material such at a nickel-tin alloy, for example. Current flowing through the thin film may distort the geometry of the retroreflective array and thereby modulate reflected light. For another example embodiment, light geometry modulator 324 may comprise a voice-coil driven mechanism. However, these are merely examples of how the geometry of retroreflective elements may be distorted in order to modulate reflected light, and the scope of the claimed subject matter is not limited in these respects.

Example system 300 also comprises a transceiver 500. Transceiver 500 may illuminate EO-ID tag 320 with polling light 130 which may comprise laser light. Polling light 130 may be received at retroreflective layer 322. Light geometry modulator 324 may distort retroreflective layer 322 in order to modulate light reflected from layer 322 to produce reflected signal 140.

Power supply 338 for this example embodiment may comprise a battery. For other embodiments, power supply 338 may comprise a photocell. Still other embodiments may comprise other types of power supplies. For some embodiments, power may be supplied by an external power source.

Control logic unit 326 may comprise any circuitry capable of causing light geometry modulator 324 to modulate according to a code. Control logic unit 326 may also comprise a memory capable of storing code data. Code data may be preprogrammed into a tag for some embodiments. Also for some embodiments, the code may be updated. For other embodiments, code information may be provided by an external data source such as data source 330. Data source 330 for one embodiment may be coupled to tag 320 via an RF link. For this and other example embodiments, the control logic unit may cause the EO-ID tag to modulate light according to a Code 39 specification.

In addition to the EO-ID applications described above, a wide range of applications are possible. Other example applications may include integrating EO-ID technologies into vehicle toll both monitoring and/or remote billing systems. The line of sight method of information polling may be effective in improving the cost associated with such system's tags. A tag with a cost of perhaps $1 or so may be placed in the front window of a car or truck. The tag may appear much like a very thin digital watch. The EO-ID tag for such an example embodiment may comprise a small solar cell for both power recharge and re-programmability. The tag may continually blink out its toll collection ID or account number. A query for a particular tracking number associated with a particular toll both or road may be actively requested by an EO-ID transceiver at a toll booth by modulating a polling laser with this request. A small photo-sensor built into the EO-ID tag may receive this signal and the tag may update its modulated output to reflect the requested tracking number.

Another possible application for EO-ID embodiments may involve EO-ID tags on aircraft and/or sea craft. The EO-ID tags may continuously modulate information desired by state, federal and/or international agencies to regulate and/or monitor air space and/or water ways for logistical, safety and security purposes. For example, all ship craft may be required to mount a cylindrical EO-ID tag at the highest mast or other point on the craft. A Coast Guard cutter may then quickly scan any craft on the horizon and quickly correlate the data being modulated by the EO-ID tag and determine if any unique course of action is desired. The technology and power requirement burden on the crafts would be small.

Embodiments of EO-ID tags may also serve as very effective search and rescue devices. For example, small (perhaps 1" diameter) EO-ID tags may be included as part of each life vest on a water craft as well as having multiple devices attached to life boats. In the event of the water craft sinking and passengers being evacuated to the life boats or free floating in the water, the modulators on the EO-ID tags may be turned on. The EO-ID tags would be visible to the sky and rescue aircraft may use a scanning laser EO-ID transceiver to rapidly search the sea for survivors of the sunken water craft. EO-ID tags for these example embodiments may operate for several months on a single coin size battery. Other embodiments may comprise a small photovoltaic cell (solar cell) and may be operated indefinitely. For one embodiment, an EO-ID tag may modulate the bar/Morse code for SOS and the name of the water craft from which the tag originates.

Embodiments of EO-ID tags may also be advantageously used in other search and rescue operations. For example, EO-ID tags may be used for land based location of lost hiking or other parties in the wilderness. Upon getting lost and/or distressed in the wilderness, the lost and/or distressed party may turn on an EO-ID tag. The tag may be positioned by the party such that the tag's modulating surface or surfaces are directed toward the sky. For example, the tag may be hung in a tree at a location with clear sky visibility such that over flying search aircraft with a scanning EO-ID transceiver may locate the lost and/or distressed party.

Figure 4:
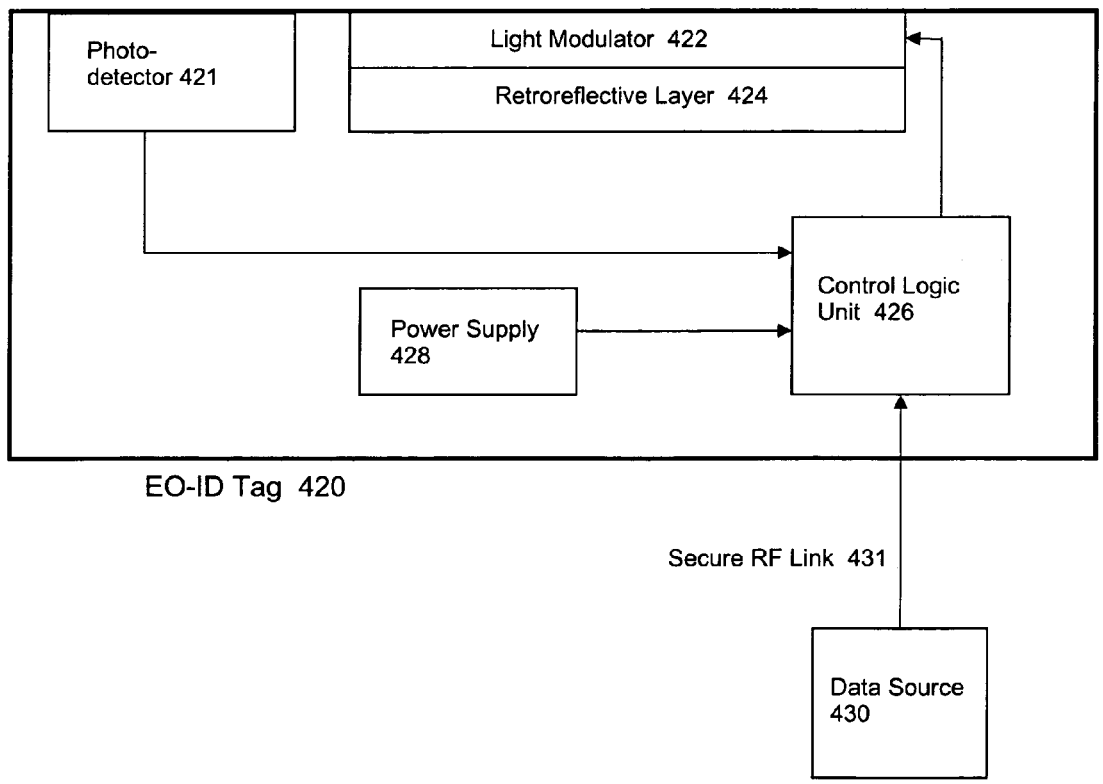
FIG. 4 is a block diagram of an example embodiment of an active optical identification tag comprising a photo-detector.

FIG. 4 is a block diagram of an example system 400 comprising a transceiver 600 capable of communicating with an EO-ID tag 420. Tag 420 for this embodiment may comprise a photo-detector 421 coupled to a control logic unit 426. Tag 420 may also comprise a light modulator 422 and a retroreflective layer 424. Tag 420 may also comprise a power supply 428. For one or more embodiments, light modulator 422, retroreflective layer 424, control logic unit 426, and/or power supply 428 may be implemented in accordance with one or more embodiments described above in connection with FIGS. 1-3. Control logic unit 426 may further be capable of receiving an input from photo-detector 421. For one embodiment, control unit 426 may, using light modulator 422, modulate reflected signal 413 according at least in part to a light signal received by photo-detector 421 and/or at least in part according to information received from a data source 430 over a secure RF link 431.

For an embodiment, EO-ID tag 420 may be maintained in a default non-reflective state where approximately no light is retroreflected to a source such as transceiver 600. For this embodiment, light modulator 422 may exit the non-reflected state and may modulate retroreflected light in response to an appropriate signal being received at photo-detector 421.

EO-ID embodiments such as system 400 comprising EO-ID tag 420 and transceiver 600 may be used to great advantage in "Friendly Fire Abatement" applications. In the modern battlefield, many of today's fire-control systems use laser guided munitions. Laser designation systems may use a modulated laser with a unique and "secret" code with which to designate a target. A benefit of this approach is that the laser guided munition is programmed to seek only to this unique and secret code reflecting off a target. However, with these systems there remains a problem of properly identifying a target. In many cases, misidentifications may lead to friendly fire casualties. As an example, consider that US forces using thermal imaging technology when identifying the difference between a US tank on the horizon as compared with a Soviet built tank have little to discriminate with except the fact that these combat vehicles have exhaust pipes on different sides of the rear of the vehicles. This hot spot on differing sides of the rear of vehicle may be what the decision to fire a highly accurate laser guided munition is based upon.

An embodiment an active EO-ID tag 420 may provide a solution to the problem of friendly fire casualties. For this embodiment, as described above, EO-ID tag 420 may comprise a micro-retroreflective array 424 with a lower power active light modulator 422. EO-ID tag 420 may also comprise photo-detector 421 with sufficient electrical bandwidth to detect the modulated designation "secret" code of allied laser guided munitions. In response to EO-ID tag 420 detecting the secret code, the tag may open and shut its light modulator 422 at a high rate with a secret friendly force code. This modulated friendly force code may be reflected back to the designating source (transceiver 600 for this example). The designating source in response to detecting the reflected friendly force code may cease to continue target designation of this now known friendly force.

For this embodiment, EO-ID tag 420 may have a default state where the light modulator is shut. That is, the EO-ID tag may have a default state where the tag is non-reflective. In this manner, if a laser designation is directed from a hostile force, the tag will not make the target more visible to the hostile force.

Friendly fire abatement EO-ID tag embodiments may be placed on any surface of a combat vehicle that may be targeted by a laser guided munition fire control system. Individual soldiers may have hemispherical shaped EO-ID tags placed on their helmets. EO-ID tags for this example embodiment may be updated with appropriate signaling codes in the field via optical, RF, or other techniques. Alternatively, solid state memory keys with signal code information may be distributed to soldiers on an update schedule and may be manually interfaced to the friendly fire abatement EO-ID tags.

The functionality of these personal/soldier based EO-ID tag embodiments may be utilized as described for their abatement functionality as well as utilized to locate soldiers lost or in distress in the field. In the event that a soldier is lost or in distress in the field he or she would place the tag in a place that is visible to over flying allied search aircraft. The tag may be in a default non-reflective, or shutter-closed state. In response to detecting a correctly modulated laser signal from a search aircraft, the EO-ID tag may modulate a return signal with an appropriate coded response.

Figure 5:
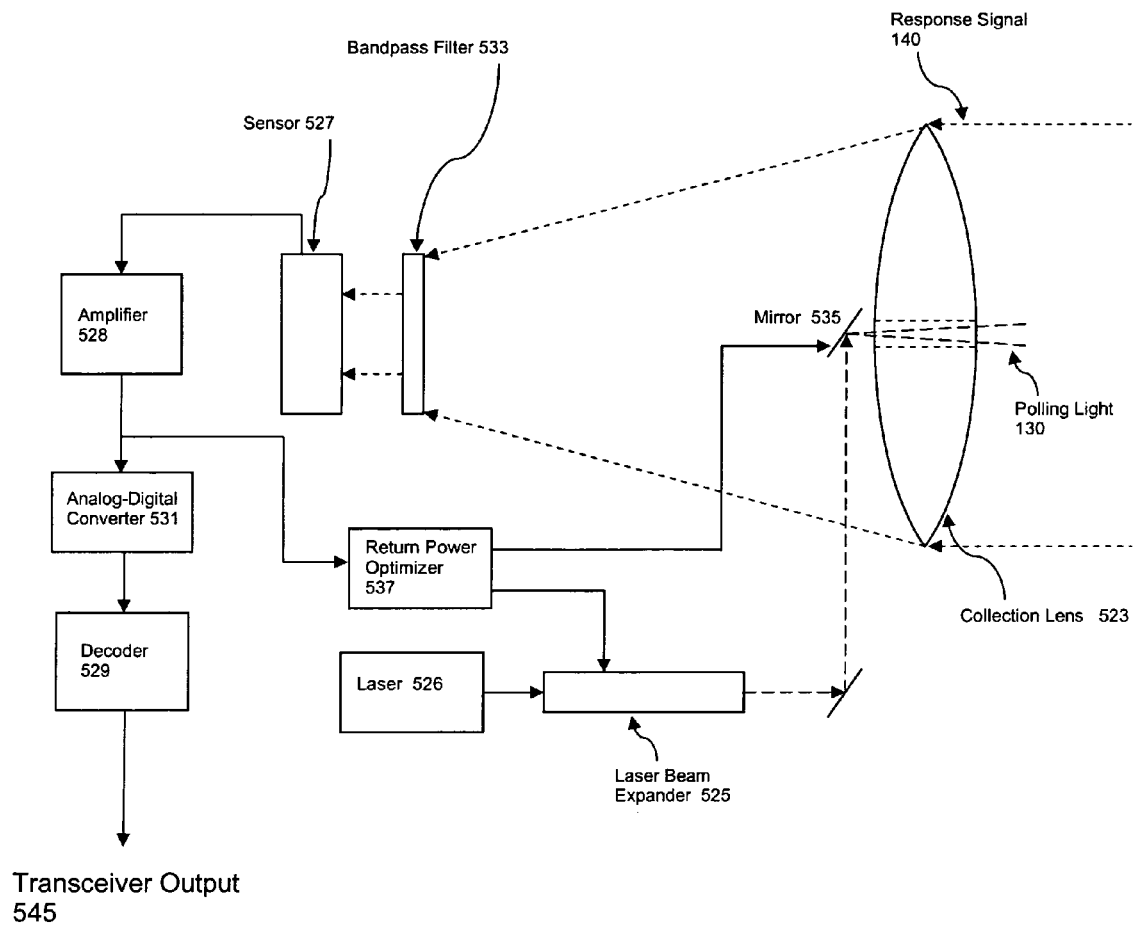
FIG. 5 is a block diagram of an example embodiment of an electro-optical transceiver.

FIG. 5 is a block diagram of an example embodiment of an electro-optical transceiver 500. A laser 526 may emit a continuous beam of light. For one embodiment, laser 526 may comprise a solid-state laser. A laser beam expander 525, comprising either a fixed beam expander or a variable beam expander may provide for beam collimation and/or shaping for optimal illumination of the EO-ID tag to be polled. The laser beam (polling light 130) may be relayed by one or more mirrors to an exit aperture, which for this example embodiment comprises a hole in a collection lens 523. A mirror 535 may be capable of scanning the pointing of polling light 130 and may also be capable of stabilizing the pointing of polling light 130 at a desired EO-ID tag.

The divergence of polling light 130 may be adjusted via optical components in transceiver 500, for example expander 525 and/or mirror 535, such that the EO-ID tag illuminating energy profile is optimized for the distance between the tag and transceiver 500. This optimization may be a trade off between having the highest level of laser energy flux on the tag while making the illumination spot big enough such that vibration and jitter of a handheld transceiver does not fall off the EO-ID tag. Closed loop optimization may be provided via a return power optimizer 537 coupled to expander 525 and mirror 535.

At least a portion of a response signal 140 comprising modulated information may be received from an illuminated EO-ID tag at a collection lens 523. Because lens 523 may not be intended for imaging purposes, lens 523 may comprise a large aperture, low-cost, thin, and lightweight Fresnel lens, although the scope of the claimed subject matter is not limited in this respect. Collection lens 523 may focus response signal 140 through a bandpass filter 533 to a sensor 527. Bandpass filter 533 may be capable of isolating response signal 140 from other radiation, thereby improving signal-to-noise ratio. An output of sensor 527 may be amplified by an amplifier 528 and may be converted to a digital signal by an analog-digital converter 531. The digital signal may be further processed and/or decoded at a decoder 529. The digital signal may be decoded according to any of a wide range of encoding/decoding techniques.

Although transceiver 500 has been described and illustrated with a particular configuration of electronic and/or optical components, transceiver 500 is merely an example embodiment, and the scope of the claimed subject matter is not limited in these respects.

Figure 6:
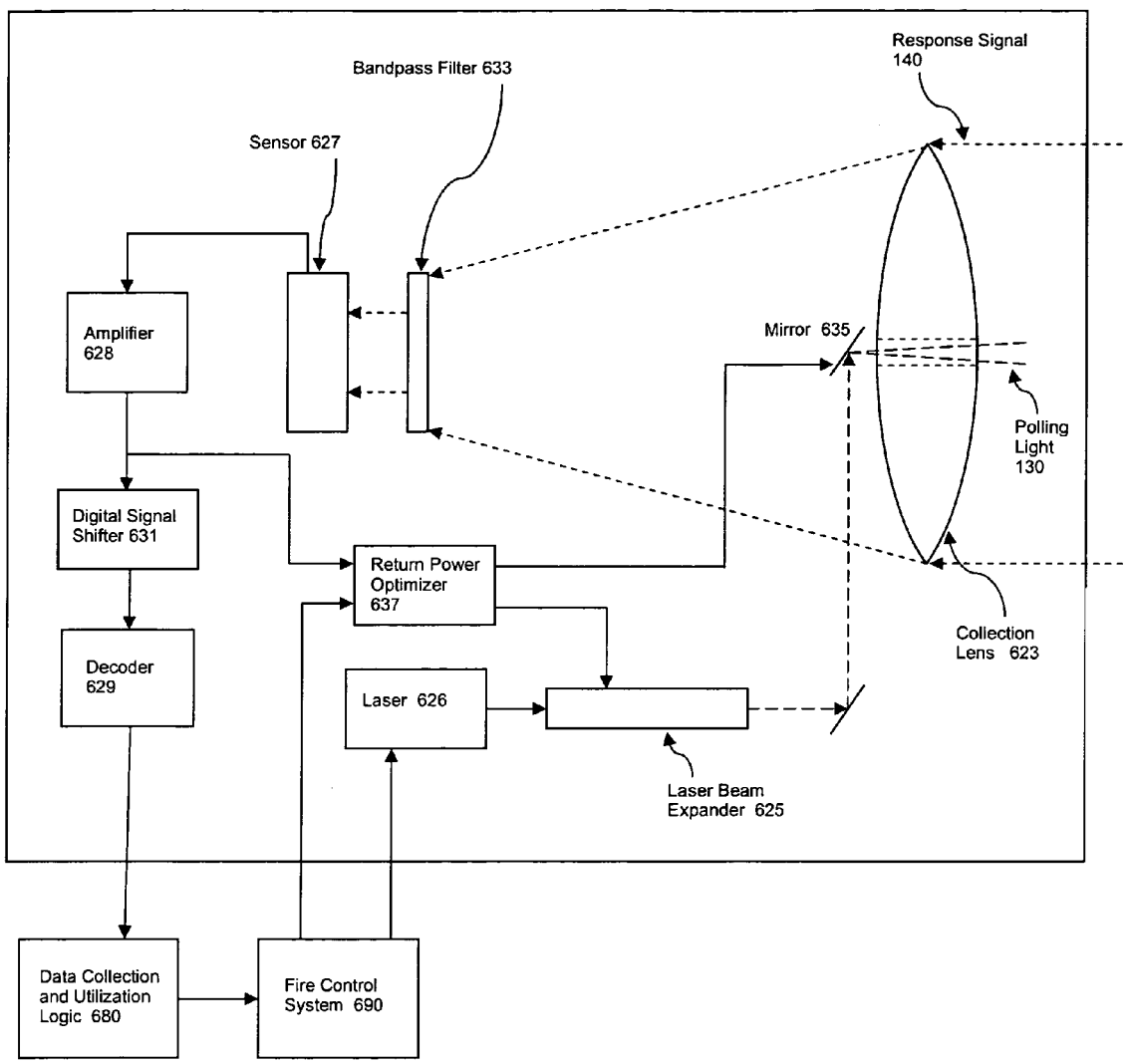
FIG. 6 is a block diagram of an example embodiment of an electro-optical transceiver coupled to a fire control system.

FIG. 6 is a block diagram of an example embodiment of an electro-optical transceiver 600 coupled to a fire control system 690 and a data collection and utilization logic unit 680. This example embodiment of transceiver 600 may be similar at least in part to example transceiver 500 discussed above. For example, transceiver 600 comprises a laser 626, a laser beam expander 625, one or more mirrors such as mirror 635, a collection lens 623, a bandpass filter 633, a sensor 627, an amplifier 628, a return power optimizer 637, a digital signal shifter 631, and a decoder 629. These units and/or components may perform functions similar to those described above in connection with transceiver 500. For this embodiment, data collection and utilization unit 680 and/or fire control system 690 may be capable of providing friendly fire abatement capabilities such as those discussed above in connection with tag 420 and FIG. 4.

Figure 7:
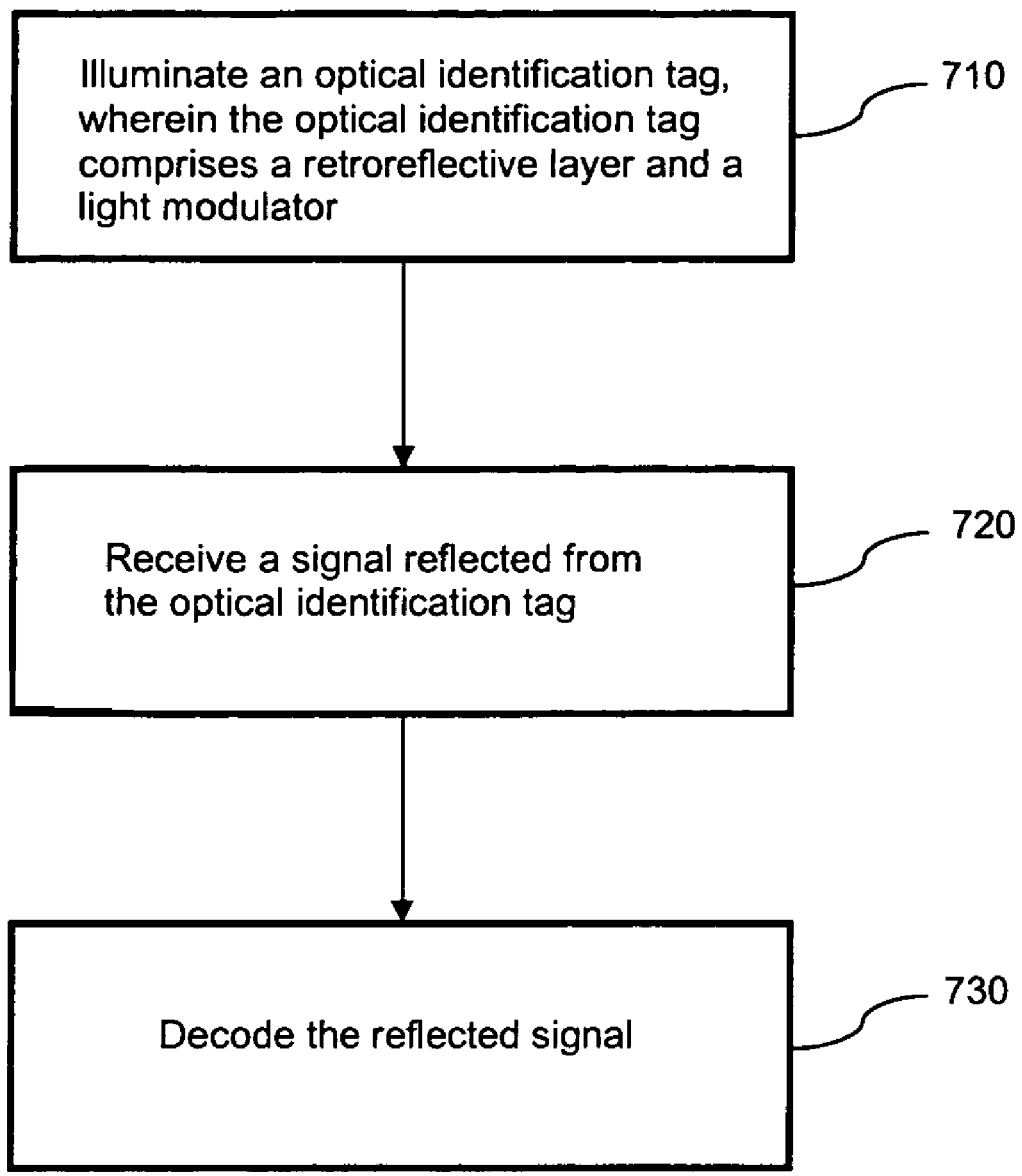
FIG. 7 is a flow diagram of an example embodiment of a method for electro-optical identification.

FIG. 7 is a flow diagram of an example embodiment of a method for electro-optical identification. At block 710, an optical identification tag is illuminated. The optical identification tag may comprise a retroreflective layer and a light modulator. At block 720, a signal reflected from the optical identification tag may be received. At block 730, the reflected signal may be decoded. The decoding operations may be performed by a transceiver or some other computing platform. An embodiment in accordance with claimed subject matter may include all, more than all or less than all of blocks 710-730. Furthermore, the order of blocks 710-730 is merely one example order, and the scope of the claimed subject matter is not limited in this respect.

Figure 8:
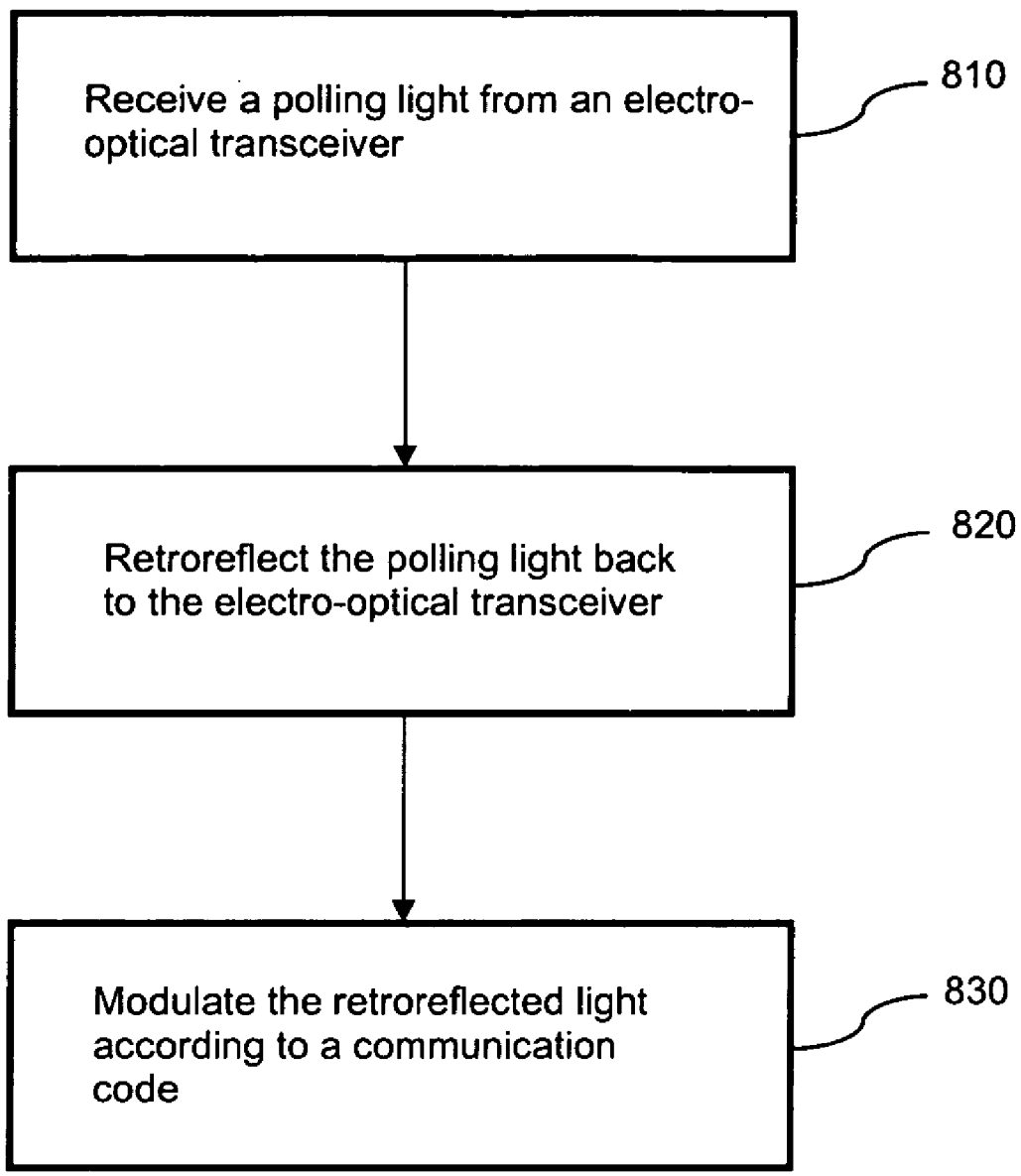
FIG. 8 is a flow diagram of an example embodiment of a method for electro-optical identification.

FIG. 8 is a flow diagram of another example embodiment of a method for electro-optical identification. At block 810, a polling light may be received from an electro-optical transceiver. The polling light may be retroreflected back to the transceiver at block 820. At block 830, the retroreflected light may be modulated according to a communication code. An embodiment in accordance with claimed subject matter may include all, more than all or less than all of blocks 810-830. Furthermore, the order of blocks 810-830 is merely one example order, and scope of the claimed subject matter is not limited in this respect.

Figure 9:
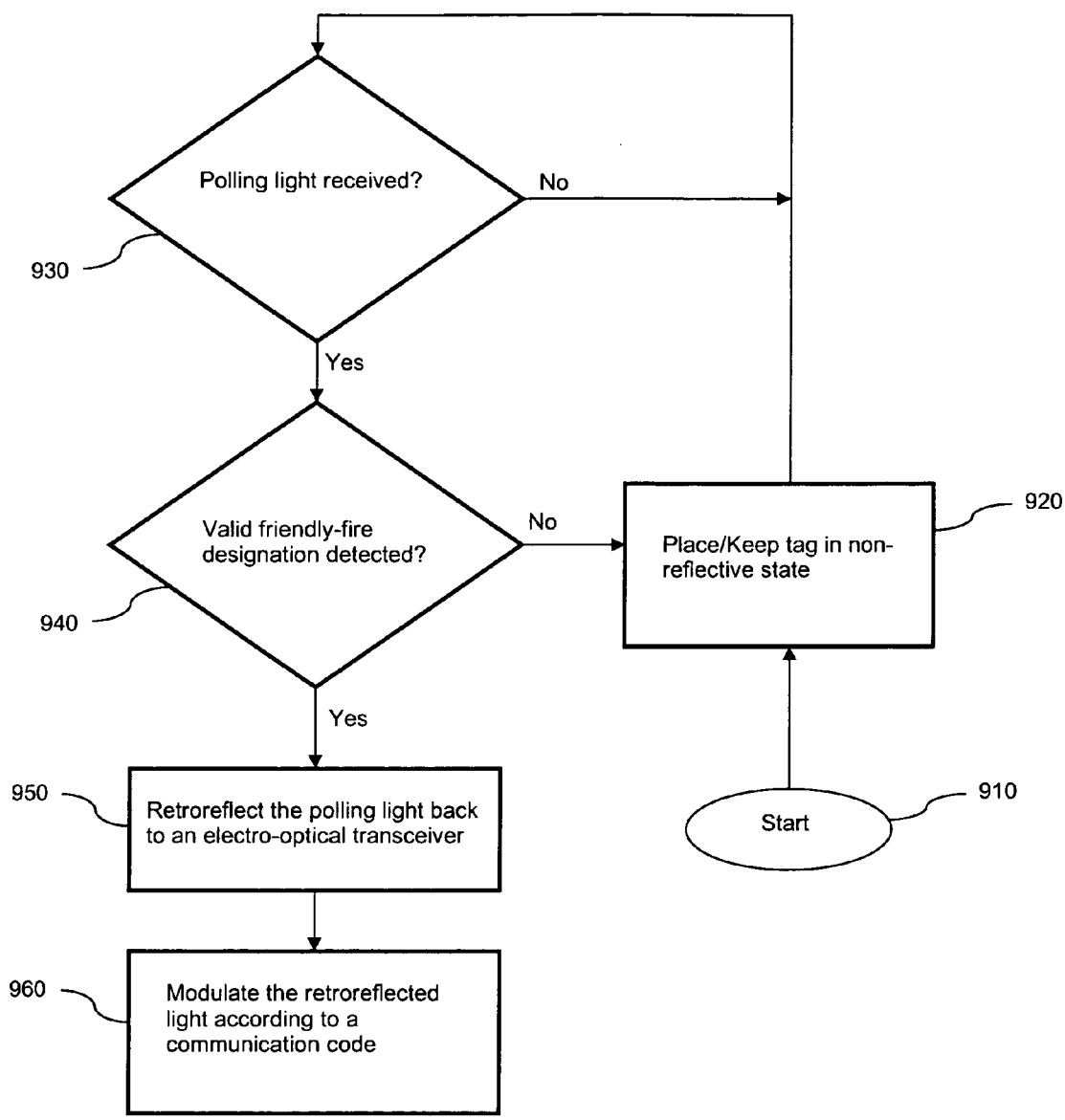
FIG. 9 is a flow diagram of an example embodiment of a method for electro-optical identification comprising friendly-fire designation detection.

FIG. 9 is a flow diagram of an example embodiment of a method for electro-optical identification comprising friendly-fire designation detection. Processing may begin at block 920. At block 920, an EO-ID tag is placed in a non-reflective state. At block 930, a determination may be made as to whether a polling light has been received. In response to a polling light being received, at block 940 a determination may be made as to whether a valid friendly-fire designation has been detected. If a valid friendly-fire designation is not detected, the tag is maintained in the non-reflective state at block 920. If a valid friendly-fire designation is detected, at block 950 the polling light may be retroreflected back to an EO-ID transceiver. At block 960, the retroreflected light may be modulated according to a communication code. An embodiment in accordance with claimed subject matter may include all, more than all or less than all of blocks 910-960.

Furthermore, the order of blocks 910-960 is merely one example order, and scope of the claimed subject matter is not limited in this respect.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. An optical identification tag, comprising:
   a retroreflective layer;
   a light modulator positioned over the retroreflective layer that is configured to temporally modulate light intensity; and
   a control logic unit configured to modulate the light modulator according to a communication code in response to detection of an initialization code in light incident on the optical identification tag.

2. The optical identification tag of claim 1, wherein the retroreflective layer comprises a plurality of micro-retroreflectors.

3. The optical identification tag of claim 1, wherein the retroreflective layer comprises a plurality of glass beads.

4. The optical identification tag of claim 1, wherein the light modulator comprises a liquid crystal shutter.

5. The optical identification tag of claim 1, wherein the light modulator comprises a micro-electromechanical system actuator array.

6. The optical identification tag of claim 5, wherein the actuator array is capable of utilizing a time-staggered shuttering sequence to produce a phased signal.

7. The optical identification tag of claim 1, wherein the light modulator comprises a suspended particle device light shutter.

8. The optical identification tag of claim 1, wherein the light modulator comprises an electrochromic light shutter.

9. The optical identification tag of claim 1, wherein the light modulator comprises a nano-chromatic light shutter.

10. The optical identification tag of claim 1, further comprising a power supply.

11. The optical identification tag of claim 10, wherein the power supply comprises a battery.

12. The optical identification tag of claim 10, wherein the power supply comprises a photocell.

13. The optical identification tag of claim 1, wherein the communication code is communicated to the control logic unit via a data link from an external data source.

14. An optical identification tag, comprising: a light geometry modulator comprising a retroreflective array; and a control unit configured to modulate the light geometry modulator according to a communication code, wherein the control unit is configured to modulate the light geometry modulator by distorting a flatness of at least a portion of the retroreflective array.

15. The optical identification tag of claim 14, wherein the retroreflective array comprises piezo electric plastic.

16. The optical identification tag of claim 14, wherein the retroreflective array comprises a film of memory shape material.

17. The optical identification tag of claim 16, wherein the memory shape material comprises a nickel tin alloy.

18. The optical identification tag of claim 14, wherein the light geometry modulator further comprises a voice coil capable of dynamically flexing the retroreflective array.

19. The optical identification tag of claim 14, further comprising a power supply.

20. The optical identification tag of claim 19, wherein the power supply comprises a battery.

21. The optical identification tag of claim 19, wherein the power supply comprises a photocell.

22. The optical identification tag of claim 14, wherein the communication code is communicated to the control unit via a data link from an external data source.

23. An optical identification tag, comprising:
    a retroreflective layer;
    a light modulator positioned over the retroreflective layer, wherein the light modulator is configured to temporally modulate light and has a default non-reflective state;
    a control logic unit; and
    a photo-detector configured to detect a polling light signal;
    wherein the control logic unit is configured to modulate the polling light signal incident upon the light modulator according to a communication code in response to a valid initialization code received by the photo-detector.

24. The optical identification tag of claim 23, wherein the retroreflective layer comprises a plurality of micro-retroreflectors.

25. The optical identification tag of claim 23, wherein the retroreflective layer comprises a plurality of glass beads.

26. The optical identification tag of claim 23, wherein the light modulator comprises a liquid crystal shutter.

27. The optical identification tag of claim 23, wherein the light modulator comprises a micro-electromechanical system actuator array.

28. The optical identification tag of claim 23, wherein the light modulator comprises a suspended particle device light shutter.

29. The optical identification tag of claim 23, wherein the light modulator comprises an electrochromic light shutter.

30. The optical identification tag of claim 23, wherein the light modulator comprises a nano-chromatic light shutter.

31. The optical identification tag of claim 23, further comprising a power supply.

32. The optical identification tag of claim 31, wherein the power supply comprises a battery.

33. The optical identification tag of claim 31, wherein the power supply comprises a photocell.

34. The optical identification tag of claim 23, wherein the communication code is communicated to the control logic unit via a data link from an external data source.

35. The optical identification tag of claim 23, wherein the initialization code comprises a friendly-fire designation and further wherein the light modulator is maintained in a non-reflective state unless responding to the friendly-fire designation.

36. A system, comprising: an optical identification tag comprising: a retroreflective layer; a light modulator positioned over the retroreflective layer, wherein the light modulator is configured to modulate light; a detector configured to detect illumination incident upon the optical identification tag; and a control logic unit configured to modulate the light modulator in response to detection of an initialization code within incident illumination by the detector; and an electro-optical transceiver comprising a light source configured to illuminate the optical identification tag and further comprising an optical sensor configured to receive a signal reflected from the optical identification tag.

37. The system of claim 36, wherein the electro-optical transceiver further comprises a decoder for decoding the signal reflected from the optical identification tag.

38. The system of claim 36, wherein the retroreflective layer comprises a plurality of micro-retroreflectors.

39. The system of claim 36, wherein the light modulator comprises a liquid crystal shutter.

40. The system of claim 36, wherein the light modulator comprises a micro-electromechanical system actuator array.

41. The system of claim 36, wherein the optical identification tag further comprises a power supply.

42. The system of claim 41, wherein the power supply comprises a battery.

43. The system of claim 41, wherein the power supply comprises a photocell.

44. The system of claim 36, wherein the communication code is communicated to the control unit via a data link from an external data source.

45. The system of claim 36, wherein the initialization code comprises a friendly-fire designation and further wherein the light modulator is maintained in a non-reflective state unless responding to the friendly-fire designation.

46. A method, comprising:
    illuminating an optical identification tag, wherein the optical identification tag comprises a retroreflective layer and a light modulator;
    detecting an initialization code within the incident illumination;
    modulating the incident illumination in response to detection of the initialization code;
    receiving a signal reflected from the optical identification tag; and
    decoding the reflected signal.

47. The method of claim 46, wherein said illuminating an optical identification tag comprises illuminating the optical identification tag with a laser.

48. The method of claim 46, wherein said decoding the reflected signal comprises decoding the reflected signal according to a code 39 specification.

49. The method of claim 46, wherein said illuminating an optical identification tag comprises illuminating the optical identification tag with a friendly-fire designation.

50. The method of claim 49, wherein said receiving a signal reflected from the optical identification tag comprises receiving a friendly force code reflected from the optical identification tag in response to the friendly-fire designation.

51. A method, comprising:
    receiving a polling light from an electro-optical transceiver at a retroreflective surface;
    retroreflecting the polling light back to the electro-optical transceiver; and
    modulating the retroreflected polling light according to a communication code by distorting a flatness of at least a portion of the retroreflective surface.

52. The method of claim 51, wherein said retroreflecting the polling light comprises retroreflecting the polling light using a plurality of micro-retroreflectors.

53. The method of claim 51, wherein said retroreflecting the polling light comprises retroreflecting the polling light using a plurality of glass beads.

54. The method of claim 51, wherein said modulating the retroreflected polling, light comprises modulating the polling light using a liquid crystal shutter.

55. The method of claim 51, wherein said modulating the retroreflected polling light comprises modulating the polling light using a micro-electromechanical system actuator array.

56. The method of claim 51, further comprising receiving the communication code via a data link from an external data source.

57. The method of claim 51, further comprising detecting a valid initialization code, wherein said modulating the retroreflected polling light comprises modulating the retroreflected polling light in response to a detection of the valid initialization code.

58. The method of claim 51, further comprising detecting a friendly-fire designation, wherein said modulating the retroreflected polling light comprises modulating the retroreflected polling light in response to a detection of the friendly-fire designation.

* * * * *

UNITED STATES PATENT AND TRADEMARK OFFICE
CERTIFICATE OF CORRECTION

| | | |
|---|---|---|
| PATENT NO. | : 7,874,490 B2 | Page 1 of 1 |
| APPLICATION NO. | : 11/479578 | |
| DATED | : January 25, 2011 | |
| INVENTOR(S) | : Thomas, III | |

It is certified that error appears in the above-identified patent and that said Letters Patent is hereby corrected as shown below:

Column 14, line 23, in Claim 54, delete "polling," and insert -- polling --.

Signed and Sealed this
Seventeenth Day of May, 2011

David J. Kappos
*Director of the United States Patent and Trademark Office*